Nov. 11, 1969   R. GARDEL ET AL   3,477,169
DOLL SOUND PRODUCING MECHANISM WITH HEAD MOVEMENT
Filed Dec. 6, 1967   4 Sheets-Sheet 1

INVENTORS
Robert Gardel and
BY Egon Jorsky
Brown & Seward
ATTORNEYS

Nov. 11, 1969  R. GARDEL ET AL  3,477,169
DOLL SOUND PRODUCING MECHANISM WITH HEAD MOVEMENT
Filed Dec. 6, 1967  4 Sheets-Sheet 2
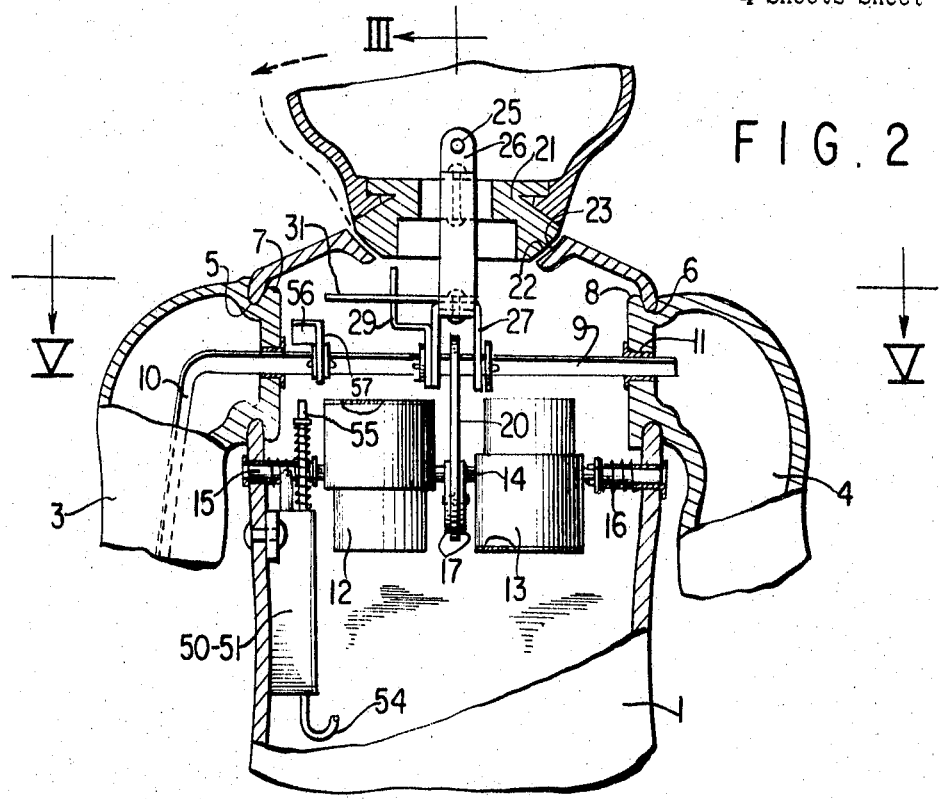
FIG. 2
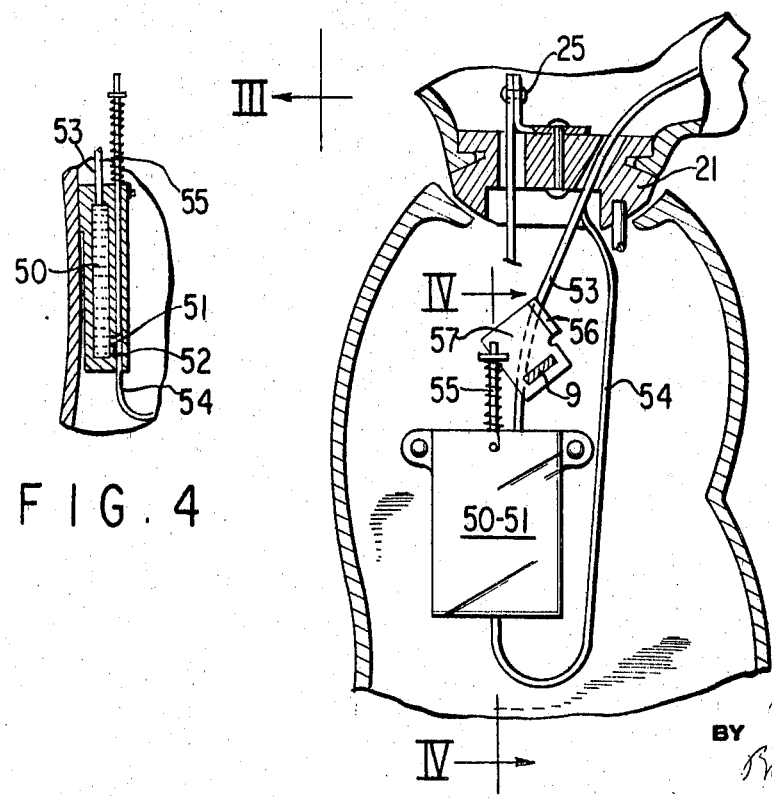
FIG. 3
FIG. 4
INVENTORS
Robert Gardel and
Egon Jorsky
BY
Brown & Seward
ATTORNEYS Nov. 11, 1969  R. GARDEL ET AL  3,477,169
DOLL SOUND PRODUCING MECHANISM WITH HEAD MOVEMENT
Filed Dec. 6, 1967  4 Sheets-Sheet 3
FIG. 5
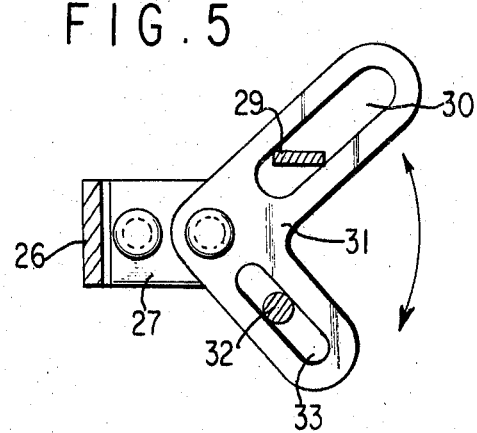
FIG. 6
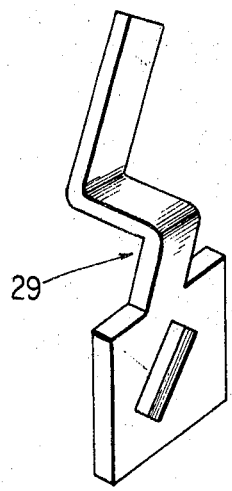
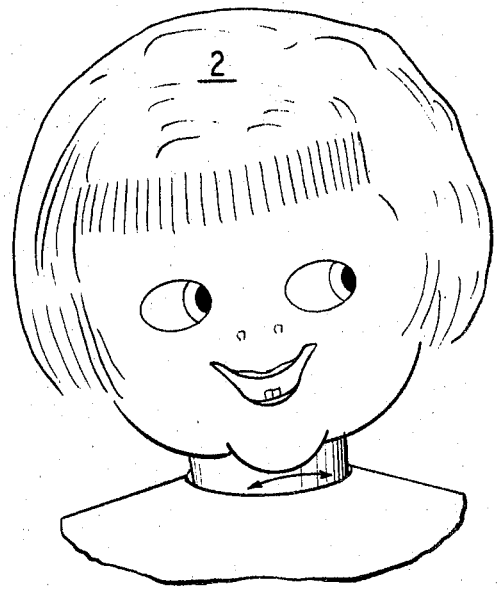
FIG. 7
INVENTORS
Robert Gardel and
BY Egon Gorsky
Brown & Seward
ATTORNEYS Nov. 11, 1969  R. GARDEL ET AL  3,477,169
DOLL SOUND PRODUCING MECHANISM WITH HEAD MOVEMENT
Filed Dec. 6, 1967  4 Sheets-Sheet 4
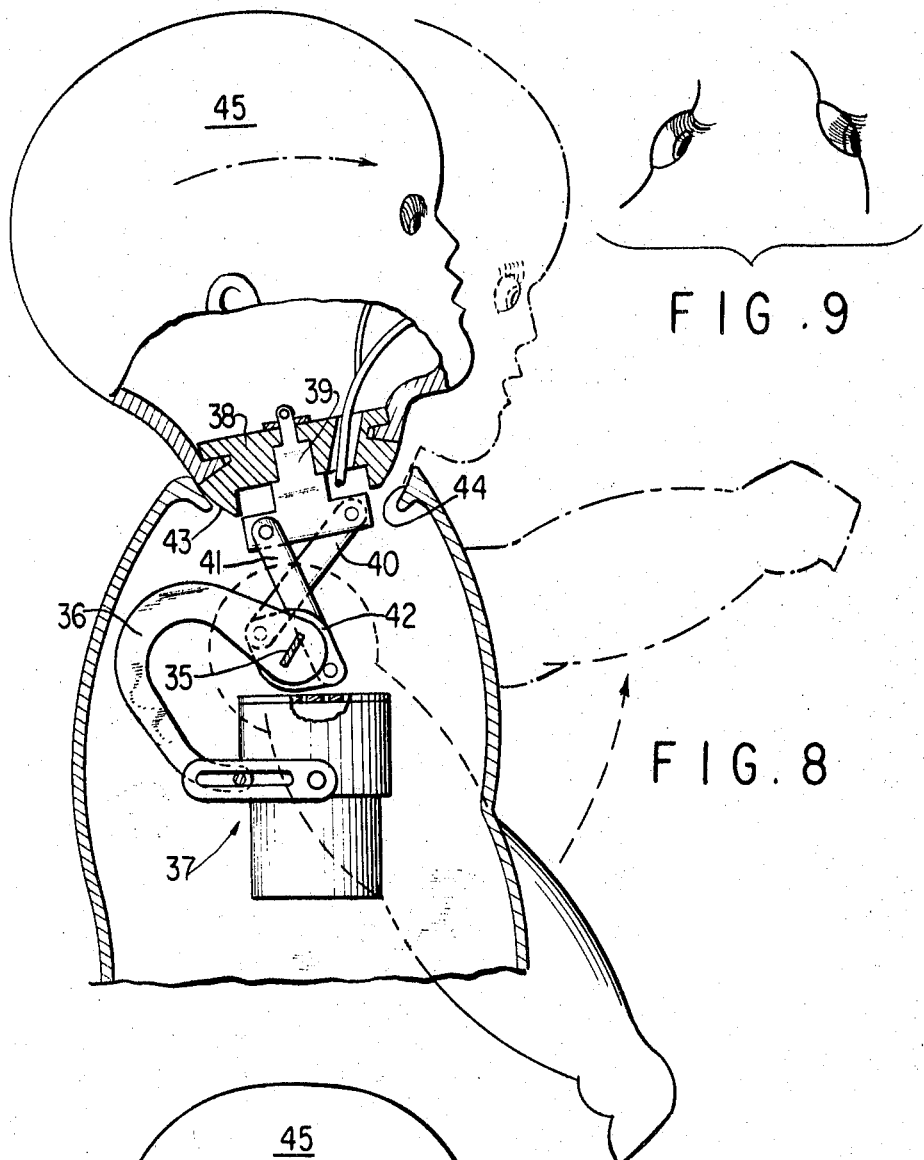
FIG. 9
FIG. 8
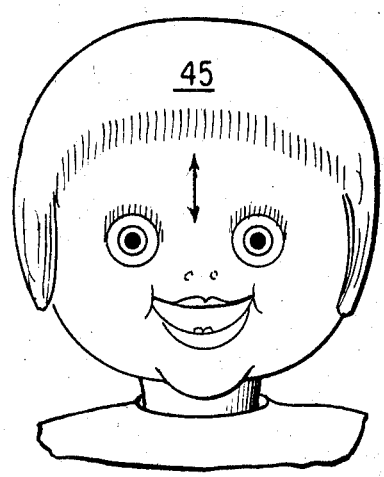
FIG. 10
INVENTORS
Robert Gardel and
Eron Gorsky
BY
Brown + Seward
ATTORNEYS United States Patent Office 3,477,169
Patented Nov. 11, 1969

3,477,169
DOLL SOUND PRODUCING MECHANISM WITH HEAD MOVEMENT
Robert Gardel, New York, and Egon Gorsky, Brooklyn, N.Y., assignors to Lettam, Inc., New York, N.Y., a corporation of New York
Continuation-in-part of application Ser. No. 513,219, Dec. 13, 1965. This application Dec. 6, 1967, Ser. No. 688,386
Int. Cl. A63h 5/00
U.S. Cl. 46—118               7 Claims

ABSTRACT OF THE DISCLOSURE

Doll sound producing and head moving mechanism in which the movement of one or both arms causes the sounding mechanism to rotate about a horizontal axis far enough to emit at least two sounds while the head nods forward and back or rocks from side to side, with or without some movement of the eyes, rotation of the head, or emission of tears.

---

In copending application Ser. No. 513,219, filed Dec. 13, 1965, of which this is a continuation-in-part, applicants disclose and claim a sounding mechanism in which two gravity responsive sound devices are mounted oppositely for rotation about a single axis, the support for said devices being designed to turn them through 180° about the axis when the position of the doll body is changed 90° (e.g., sitting to lying or vice versa).

According to the present invention similarly coordinated sound devices are arranged to be turned in response to movements of the doll's arm or arms, and the mechanism simultaneously causes movements of the head, more or less in synchronism with the sounds being emitted by the sound devices. The connection between the arm and the sound devices is such that a 90° arm movement causes 180° rotation of the sound devices and thus produces a "double" laughing, crying or other sound.

Practical embodiments of the invention are shown in the accompanying drawings, wherein:

FIG. 2 represents a vertical section through the doll torso and lower part of the head in a plane normal to the plane of FIG. 1, parts being broken away.

FIG. 3 represents a vertical section on the line III—III of FIG. 2, showing an elevation of the "tearing" elements.

FIG. 4 represents a detail vertical section on the line IV—IV of FIG. 3.

FIG. 5 represents a detail horizontal section on the line V—V of FIG. 2 showing the bell crank between the arm mechanism and the head mounting.

FIG. 6 represents a detail perspective view of the lever which actuates the bell crank.

FIG. 7 represents a front view of the doll head, showing the nature of the head and eye movement.

FIG. 8 represents a vertical section, as in FIG. 1, showing an alternative form of head mounting and moving mechanism.

FIG. 9 represents a detail side view of a doll eye in two positions corresponding to movements of the head as indicated in FIG. 8.

FIG. 10 represents a front view of the doll head (of FIG. 8) indicating the nature of the head movement.

Figures 1, 1A:
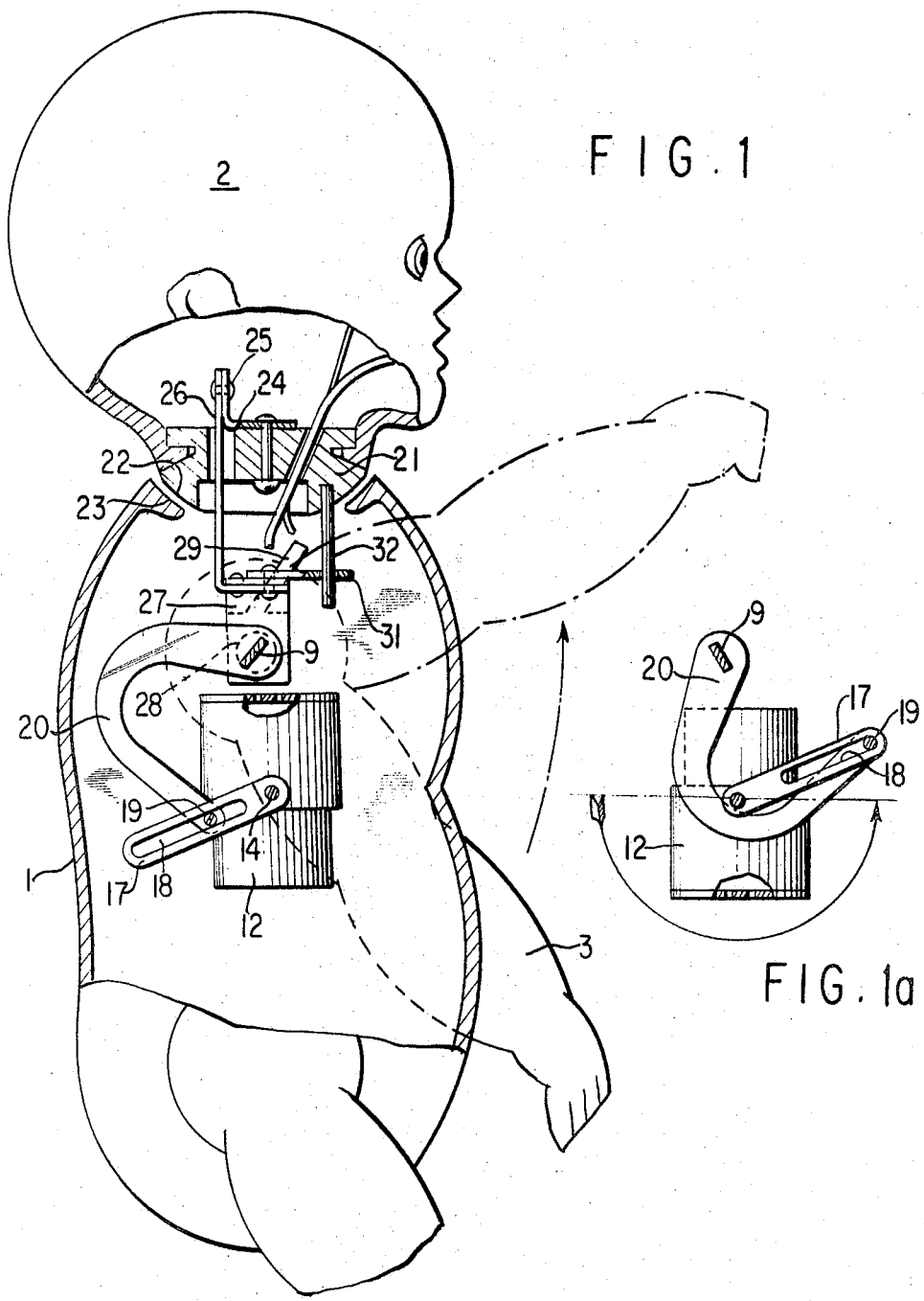
FIG. 1 represents a vertical section on the medial plane through a doll torso and lower part of the head, parts being broken away and the arm being shown in full lines in its lower position and in broken lines in upper position.
FIG. 1a represents a detail elevation of the connection between the arm and the sound mechanism corresponding to movement of the arm to its upper position.

Referring to FIGS. 1 through 7, the doll is shown as having a torso 1, a head 2 and arms 3, 4, the torso being provided with circular arm openings disposed in substantially parallel and vertical planes and the arms being formed with grooves 5, 6 and flanges 7, 8 adapted to be snapped into the arm openings for articulation of the arms to the torso in a known manner. A drive shaft 9, preferably non-circular in cross-section, extends across the torso on the axis of rotation of the arms, one end 10 of the shaft being bent to extend some distance into the arm 3 through the closed upper end of the arm and the other end of the shaft being journaled in a fitting 11 in the closed upper end of the arm 4. The shaft 9 thus can be rotated by movement of the arm 3, while the arm 4 can be moved without affecting the shaft.

A pair of gravity-operated sound devices 12, 13 are connected by a short axle 14 and are mounted on stub shafts 15, 16 journaled in the sides of the doll torso just below the arm openings, the spring and grommet arrangement being of the type shown and described in Gardel Patent No. 3,168,794, Feb. 9, 1965. The sound devices 12, 13 are oriented oppositely so that 180° rotation in a given direction causes one to emit a sound or sounds while the other assumes its "loaded" condition, and 180° rotation in the opposite direction causes the "loaded" one to emit sounds while the first one is "loaded." Actuation of the sound devices is effected through the provision of a double lever 17 fixed on the axle 14, the lever having a longitudinal slot 18, adapted to receive the actuating pin 19 on the end of a hook-shaped lever 20 mounted at its other end on the shaft 9, as clearly shown in FIGS. 1, 1a and 2. From a comparison of FIGS. 1 and 1a it will be seen that lifting the arm 3 from its lower position through about 90° to its upper position causes the lever 20, acting through the engagement of pin 19 in slot 18, to swing the lever 17 in a 180° arc, the axle 14 and sound devices 12, 13 being correspondingly rotated about the axis of axle 14 and shafts 15, 16. Moving the arm from upper to lower position has the reverse effect, rotating the sound devices back through 180° in the opposite direction with corresponding emission of sounds.

The head 2 is provided with a neck plug 21 the outer surface 22 of which is preferably approximately spherical and designed to fit with only a small clearance within the spherically shaped walls 23 of the neck opening in the torso. An angle bracket 24 on the plug 21 is pivotally secured at 25 to the upper end of the head supporting strip 26 which extends through an opening in the plug and is fixed at its lower end to an inverted U-shaped mounting piece 27, the sides of which are provided with openings 28 to accommodate the shaft 9. A lever 29 (FIGS. 1, 2, 5 and 6) is mounted on the shaft 9 adjacent the piece 27, the upwardly projecting end of said lever being in engagement with a slot 30 in one arm of a bell crank 31 (FIGS. 1, 2 and 5) pivotally mounted on top of the piece 27. A pin 32 is fixed in the neck plug 21 and projects downwardly into engagement with the slot 33 in the other arm of the bell crank. The pivot 25 is preferably close to the center of curvature of the cylindrical surfaces 22, 23, at least in the front-to-back direction.

It will be evident that movement of the arm 3 and shaft 9 will result in movement of the bell crank 31 by the lever 29. The bell crank, in turn, communicates its movement to the pin 32 and thus rocks the head from side to side around the axis of the pivot 25, this movement being illustrated in FIG. 7. An intriguing effect is obtained by providing this head with eyes mounted to turn from side to side in response to gravity so that, when the head is tilted to its right, the eyes go left and vice versa, as shown in FIG. 7.

In the modification of FIGS. 8, 9 and 10 the arm shaft 35, lever 36 and sound device mechanism designated generally by 37 differ from the corresponding parts described above only in that the curvature of lever 36 brings its point of engagement with the lever 37 closer to the axis of rotation of the sound devices, so that movement of the doll arm through an arc of about 60° is sufficient to invert said devices. In this form, the neck plug 38 is provided with a central opening in which is fixed an inverted T-shaped bracket 39, the front and rear lower ends of which are connected by links 40, 41 to the rear and front ends of a rocker 42 mounted on the shaft 35 adjacent to the lever 36. The neck plug 38 has a substantially spherical surface 43 loosely fitting in the complementary surface 44 of the torso neck opening. Rotation of the shaft 35 moves the rocker 42 and this motion causes the links 40, 41 to rock the head in a forward and back direction, as indicated in broken lines in FIG. 8 and in FIG. 10.

Eyes mounted in a normal manner for opening and closing by gravity may desirably be used in the head 45, such eyes being wide open when the head is erected or tilted forward and partly closed when the head is tilted rearward, as illustrated in the left and right views of FIG. 9.

Since the aural and visual attributes of dolls embodying the mechanism described above include the production of unusual sounds plus head and eye movements, it is appropriate to include optionally a "tearing" mechanism, shown in FIGS. 2, 3 and 4. This comprises a flat rectangular reservoir 50 having a pump chamber 51 formed integrally therewith, a small passage 52 being provided to permit water to flow from the lower part of the reservoir into the pump chamber at a point above its bottom end. A filling tube 53 leads to the top of the reservoir from any suitable inlet port, such as the doll's mouth, and a tear duct 54 leads from the bottom of the chamber 51 to outlets at the inner corners of the eyes. An elongated plunger 55 in the pump chamber has its upper end in a position to be contacted by the flat plate 56 on a lever 57 carried by the shaft 9 so that, when the arm 3 is raised, the plate 56 pushes the plunger down toward the bottom of the pump chamber (against the force of the small spring 58) and, during the last part of its stroke, the plunger forces into the tear duct a small quantity of water trapped in the bottom of the chamber below the passage 52. The amount of water pumped at each stroke is sufficient to be recognizable as "tear drops" but not enough to be objectionable. Furthermore, the water circuit preferably has its inlet and outlet close together (mouth and eyes) so that the danger of spilling is practically eliminated without need for valves.

The connection between levers 17 and 20 through pin 19 and slot 18 constitutes a differential connection in that the levers move through different arcs around their axes. Mechanically equivalent connections, as by substitution of a link for the pin and slot, are contemplated.

A single doll may be provided with the arm actuated sound producing mechanism, or with arm actuated head moving, or with arm actuated "tearing," each without the others, but the inclusion of all three features, coordinated and synchronized as described, adds greatly to the appeal of the doll as the mechanisms in this field become increasingly complex and sophisticated. The present mechanism has the great practical advantage of achieving sophisticated results in a very simple manner. If selectivity of functions is deemed desirable, one arm can be made the actuating means for any one or two of the functions with the other arm being responsible for the remaining function or functions as by providing the normally inactive arm with a drive sleeve coaxial with the drive shaft 9 and connected in an obvious manner to the parts intended for separate actuation. In some situations it might be desired to use a leg as a mechanism actuating limb instead of, or in addition to, an arm.

It will be understood that various changes may be made in the form, construction and arrangement of the several parts without departing from the spirit and scope of the invention and hence I do not intend to be limited to the details shown or described herein except as the same are included in the claims or may be required by disclosures of the prior art.

What we claim is:

1. A doll sound producing mechanism comprising, sound producing mechanism comprising, sound mechanism supporting means in a doll torso and adapted to support said mechanism for rotation about a horizontal axis, at least one gravity actuated sound device fixed on said supporting means, a drive shaft operatively connected to a limb of the doll and linkage connecting said drive shaft to said supporting means, the linkage being so designed and arranged that rotation of the drive shaft through approximately 90° causes rotation of the supporting means through approximately 180°, means carried by the drive shaft for pivotally supporting a doll head, and means fixed on the drive shaft and operatively connected to the doll head supporting means for moving said head.

2. A mechanism according to claim 1 in which there are two sound devices fixed oppositely on the supporting means.

3. A mechanism according to claim 1 in which the head is pivoted for side to side movement.

4. A mechanism according to claim 3 which includes an element projecting downwardly from the head and a bell crank pivotally mounted on the head supporting means, the downwardly projecting element being in engagement with one arm of said crank and the means fixed on the drive shaft being in engagement with the other of said arms.

5. A mechanism according to claim 1 in which the head supporting means includes a rocker fixed on the drive shaft and links connecting oppositely disposed pivot points on said rocker with spaced pivot points of said head.

6. A mechanism according to claim 5 in which the links are crossed.

7. A mechanism according to claim 1 which includes a liquid reservoir adapted to be located in the doll body, a liquid conduit adapted to convey liquid to a desired point, a pump between the reservoir and the conduit, and means fixed to the drive shaft for actuating the pump when said shaft is rotated.

References Cited

UNITED STATES PATENTS

| 1,449,601 | 3/1923 | Haskell | 46—117 |
| 1,967,818 | 7/1934 | Gershowitz | 46—118 |
| 2,137,371 | 11/1938 | Marsh | 46—120 |
| 2,346,580 | 4/1944 | Henry | 46—187 |
| 3,012,366 | 12/1961 | Faulkner | 46—120 XR |
| 3,053,009 | 9/1962 | Ostrander. | |

FOREIGN PATENTS 1,111,267  10/1955  France.

F. BARRY SHAY, Primary Examiner

H. DINITZ, Assistant Examiner

U.S. Cl. X.R.

46—135, 187